US012543792B2

(12) United States Patent
Courbat et al.

(10) Patent No.: US 12,543,792 B2
(45) Date of Patent: Feb. 10, 2026

(54) LIQUID-CONVEYING SUSCEPTOR ASSEMBLY FOR CONVEYING AND INDUCTIVELY HEATING AN AEROSOL-FORMING LIQUID

(71) Applicant: Philip Morris Products S.A., Neuchatel (CH)

(72) Inventors: Jerome Christian Courbat, Cortaillod (CH); Oleg Mironov, Cudrefin (CH); Özgür Özsun, Kilchberg (CH)

(73) Assignee: Philip Morris Products S.A., Neuchatel (CH)

( * ) Notice: Subject to any disclaimer, the term of this patent is extended or adjusted under 35 U.S.C. 154(b) by 595 days.

(21) Appl. No.: 17/998,507

(22) PCT Filed: May 12, 2021

(86) PCT No.: PCT/EP2021/062567
§ 371 (c)(1),
(2) Date: Nov. 11, 2022

(87) PCT Pub. No.: WO2021/228909
PCT Pub. Date: Nov. 18, 2021

(65) Prior Publication Data

US 2023/0189891 A1 Jun. 22, 2023

(30) Foreign Application Priority Data

May 15, 2020 (EP) .................................... 20175043

(51) Int. Cl.
*A24F 40/465* (2020.01)
*A24F 40/10* (2020.01)
(Continued)

(52) U.S. Cl.
CPC ............ *A24F 40/465* (2020.01); *A24F 40/10* (2020.01); *A24F 40/30* (2020.01); *A24F 40/42* (2020.01);
(Continued)

(58) Field of Classification Search
CPC ........ A24F 40/465; A24F 40/10; A24F 40/44; A24F 40/46; H05B 6/108; A61M 11/042; A61M 15/06
See application file for complete search history.

(56) References Cited

U.S. PATENT DOCUMENTS

2003/0026534 A1* 2/2003 Skull .................... G02B 6/0218 385/27
2015/0245669 A1 9/2015 Cadieux et al.
(Continued)

FOREIGN PATENT DOCUMENTS

EP 2 444 112 A1 4/2012
EP 3 110 270 A1 1/2017
(Continued)

OTHER PUBLICATIONS

Combined Russian Office Action and Search Report issued Aug. 16, 2024 in Russian Patent Application No. 2022132241/03 (with unedited computer-generated English Translation), 12 pages.
(Continued)

*Primary Examiner* — Michael H. Wilson
*Assistant Examiner* — Michael Patrick Mullen
(74) *Attorney, Agent, or Firm* — Oblon, McClelland, Maier & Neustadt, L.L.P.

(57) ABSTRACT

A liquid-conveying susceptor assembly is provided for conveying and inductively heating an aerosol-forming liquid under an influence of an alternating magnetic field, the susceptor assembly including a filament bundle, the filament bundle including at least a plurality of first filaments includ-
(Continued)

ing a first susceptor material, in which along at least a parallel-bundle portion of the filament bundle the plurality of first filaments are arranged parallel to each other. An inductive heating assembly for conveying and inductively heating an aerosol-forming liquid is also provided. An aerosol-generating article for an inductively heatable aerosol-generating device is also provided. And, an aerosol-generating system including an inductively heatable aerosol-generating device and an aerosol-generating article for the aerosol-generating device is also provided.

21 Claims, 4 Drawing Sheets

(51) Int. Cl.

| | |
|---|---|
| ***A24F 40/30*** | (2020.01) |
| ***A24F 40/42*** | (2020.01) |
| ***A24F 40/44*** | (2020.01) |
| ***A24F 40/50*** | (2020.01) |
| ***H05B 6/10*** | (2006.01) |

(52) U.S. Cl.

CPC .............. *A24F 40/44* (2020.01); *A24F 40/50* (2020.01); *H05B 6/108* (2013.01)

(56) References Cited

U.S. PATENT DOCUMENTS

| | | | |
|---|---|---|---|
| 2017/0105452 A1 | 4/2017 | Mironov et al. | |
| 2018/0125119 A1 | 5/2018 | Cadieux et al. | |
| 2018/0136073 A1 | 5/2018 | Lerman et al. | |
| 2018/0136075 A1 | 5/2018 | Lerman et al. | |
| 2019/0313701 A1 | 10/2019 | Cadieux et al. | |
| 2021/0008326 A1* | 1/2021 | Kuzelka ................ | A61M 16/12 |
| 2021/0093006 A1 | 4/2021 | Potter et al. | |

FOREIGN PATENT DOCUMENTS

| | | |
|---|---|---|
| EP | 3 520 637 A1 | 8/2019 |
| JP | 2017-506915 A | 3/2017 |
| JP | 2017-515486 A | 6/2017 |
| RU | 2 680 438 C2 | 2/2019 |
| WO | WO 2015/131058 A1 | 9/2015 |
| WO | WO 2015/175568 A1 | 11/2015 |
| WO | WO 2015/177044 A1 | 11/2015 |
| WO | WO 2019/145710 A1 | 8/2019 |

OTHER PUBLICATIONS

International Search Report & Written Opinion issued Aug. 10, 2021 in PCT/EP2021/062567, filed on May 12, 2021, 20 pages.

Japanese Office Action issued on Mar. 6, 2025 in Japanese Patent Application No. 2022-569087 (with English translation), 10 pages.

* cited by examiner

LIQUID-CONVEYING SUSCEPTOR ASSEMBLY FOR CONVEYING AND INDUCTIVELY HEATING AN AEROSOL-FORMING LIQUID

The present disclosure relates to a liquid-conveying susceptor assembly for conveying and inductively heating an aerosol-forming liquid. The invention further relates an inductive heating assembly and an aerosol-generating article, each comprising such a susceptor assembly. The invention also relates to an aerosol-generating system comprising an inductively heating aerosol-generating device and an aerosol-generating article for use with the device.

Generating inhalable aerosols by heating aerosol-forming liquids is generally known from prior art. For this, a liquid aerosol-forming substrate may be conveyed by a wick element from a liquid reservoir into a region outside the reservoir, where it may be vaporized by a heater and exposed to an air path to be subsequently drawn out as an aerosol. The heater may be an inductive heater. In particular, the wick element may be an inductively heatable wick element which comprises a susceptor material and, thus, is capable to perform both functions: wicking and heating. Hence, when being exposed to an alternating magnetic field, the wick element heats up due at least one of eddy currents or magnetic hysteresis losses which are induced in the wick element depending on its magnetic and electrical properties. Accordingly, such a wick element may also be considered as liquid-conveying susceptor or susceptor assembly.

There are various configurations of the wick element, such as mesh configurations. However, many of these configurations are complex and thus laborious to manufacture.

Therefore, it would be desirable to have a liquid-conveying susceptor assembly, an inductive heating assembly, an aerosol-generating article and an aerosol-generating system with the advantages of prior art solutions, whilst mitigating their limitations. In particular, it would be desirable to have a liquid-conveying susceptor assembly, an inductive heating assembly, an aerosol-generating article and an aerosol-generating system including a liquid-conveying susceptor which is easy and inexpensive to manufacture.

According to an aspect of the present invention, there is provided a liquid-conveying susceptor assembly for conveying and inductively heating an aerosol-forming liquid under the influence of an alternating magnetic field. The susceptor assembly comprises a filament bundle, wherein the filament bundle comprises at least a plurality of first filaments including a first susceptor material. Along at least a parallel-bundle portion of the filament bundle, the plurality of first filaments are arranged parallel to each other.

According to the invention it has been found that a susceptor assembly comprising a filament bundle having a parallel-bundle portion along at least part of its length extension may be easy and inexpensive to manufacture, in particular as compared to more complex susceptor assembly configurations, such as mesh configurations. Basically, such a susceptor assembly may be manufactured by bundling a plurality of individual filaments arranged at least partially in a parallel order to a filament bundle and cutting the filament bundle to desired length.

As used herein, the term "parallel" refers to a substantially parallel arrangement including small deviations from a perfect parallel arrangement by at most 5 degrees, in particular by at most 2 degree, preferably at most 1 degree, more preferably by at most 0.5 degree. That is, in the parallel-bundle portion the filaments may diverge from each other by at most 5 degrees, in particular by at most 2 degree, preferably at most 1 degree, more preferably by at most 0.5 degree.

Filaments are particularly suited for conveying liquids because they inherently provide a capillary action. Moreover, in the filament bundle, the capillary action is further enhanced due to the narrow spaces formed between the pluralities of filaments when being bundled. In particular, this applies for the parallel-bundle portion of the filament bundle along which the capillary action is constant as the narrow spaces between the filaments do not vary along that portion. Therefore, the parallel-bundle portion is particularly suitable for being—at least partially—immersed into a liquid reservoir in order to wick aerosol-forming liquid from the liquid reservoir into a region outside the reservoir. There, the conveyed liquid may be vaporized and exposed to an air path to be drawn out as an aerosol.

Preferably, the filament bundle is an unstranded filament bundle. In an unstranded filament bundle, the filaments of the filament bundle run next to each other without crossing each other, preferably along the entire length extension of the filament bundle. In particular in the parallel-bundle portion, the filaments run parallel to each other without crossing each other. Likewise, the filament bundle may comprise a stranded portion, in which the filaments of the filament bundle are stranded. A stranded portion may enhance the mechanical stability of the filament bundle.

Preferably, the plurality of first filaments are solid material filaments. Solid material filaments are inexpensive and easy to manufacture. In addition, solid material filaments provide a good mechanical stability, thus making the filament bundle robust.

For the same reasons, the plurality of first filaments preferably are single grade material filaments. Accordingly, the plurality of first filaments preferably are made of the first susceptor material.

Due to the first filaments including or being made of a first susceptor material, the filament bundle is capable to perform both functions: conveying and heating an aerosol-forming liquid. Advantageously, this double function allows for a very material saving and compact design of the susceptor assembly without separate means for conveying and heating. In addition, there is a direct thermal contact between the heat source, that is, the filaments and the aerosol-forming liquid adhering to the filaments. Unlike in case of a heater in contact with a saturated wick, a direct contact between the filaments and a small amount of liquid advantageously allows for flash heating, that is, for a fast onset of evaporation.

As used herein, the term "susceptor material" refers to a material that is capable to convert electromagnetic energy into heat when subjected to an alternating magnetic field. This may be the result of at least one of hysteresis losses or eddy currents induced in the susceptor material, depending on its electrical and magnetic properties. Hysteresis losses occur in ferromagnetic or ferrimagnetic susceptor materials due to magnetic domains within the material being switched under the influence of an alternating electromagnetic field. Eddy currents are induced in electrically conductive susceptor materials. In case of an electrically conductive ferromagnetic or ferrimagnetic susceptor material, heat is generated due to both, eddy currents and hysteresis losses.

Accordingly, the first susceptor material may be formed from any material that can be inductively heated to a temperature sufficient to generate an aerosol from the aerosol-forming substrate. Therefore, the first susceptor material may comprise or may be made of a material that is at least one of electrically conductive and ferromagnetic or ferrimagnetic, respectively. That is, the first susceptor material may comprise or may be made of one of a ferrimagnetic material, or a ferromagnetic material, or an electrically conductive material, or electrically conductive ferrimagnetic material or electrically conductive ferromagnetic material.

For example, the first susceptor material may comprise or may be made of one of a ferrite, aluminium, iron, nickel, copper, bronze, cobalt, a nickel alloy, plain-carbon steel, stainless steel, ferritic stainless steel, ferromagnetic stainless steel, martensitic stainless steel, or austenitic stainless steel.

The wicking or capillary action generally relies on a reduction in the surface energy of the two separate surfaces, the liquid surface and the solid surface of the filaments. The wicking or capillary action includes an effect that depends on the radius of curvature of both the liquid surface and the filaments. Hence, there may be a need for large surface areas and small radii of curvature, both of which are achieved by the small diameter of the filaments and the brush-like nature of the filament bundle. The radius of curvature of the filaments is important as the liquid wets the filaments.

Accordingly, the plurality of first filaments may have a diameter of at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter.

Vice versa, the diameter of the first filaments preferably has a certain minimum that is related to the so-called skin depth. The skin depth is a measure of how far electrical conduction takes place in an electrically conductive susceptor material when being inductively heated. Unlike DC currents, AC currents mainly flow at the 'skin' of an electrical conductor between an outer surface of the conductor and a level which is called the skin depth. The AC current density is largest near the surface of the conductor, and decreases with greater depths in the conductor. This phenomenon is known as skin effect which basically is due to opposing eddy currents induced by the alternating magnetic field. Preferably, the plurality of first filaments have a diameter of at least twice the skin depth in order to induce a sufficient amount of eddy currents and thus to generate a sufficient amount of heat energy.

In general, the skin depth is a function of the permeability and the electrical conductivity of the susceptor material as well as of the frequency of the AC driving current or frequency of the alternating magnetic field, respectively. Preferably, the susceptor assembly is operated with a high-frequency alternating magnetic field. As referred to herein, the high-frequency electromagnetic field may be in the range between 500 kHz (kilo-Hertz) to 30 MHz (Mega-Hertz), in particular between 5 MHz (Mega-Hertz) to 15 MHz (Mega-Hertz), preferably between 5 MHz (Mega-Hertz) and 10 MHz (Mega-Hertz).

Depending on the materials and the frequency of the alternating magnetic field used, the plurality of first filaments may have a diameter of at least 0.015 millimeter, at least 0.02 millimeter, at least 0.025 millimeter at least 0.05 millimeter, at least 0.075 millimeter, at least 0.1 millimeter, at least 0.125 millimeter, at least 0.15 millimeter, at least 0.2 millimeter, at least 0.3 millimeter or at least 0.4 millimeter.

In general, the plurality of first filaments may have any cross-sectional shape suitable for conveying aerosol-forming liquid when being bundled. Accordingly, at least one of, in particular each one of the plurality of first filaments may have a circular, an ellipsoidal, an oval, a triangular, a rectangular, a quadratic, a hexagonal or a polygonal cross-section. Preferably, all first filaments have the same cross-section. It is also possible that one or more filaments of the plurality of first filaments have a cross section that is different from the cross-sections of one or more other filaments of the plurality of first filaments. Preferably, the plurality of first filaments have a circular, an ellipsoidal or an oval cross-section. Advantageously, the latter cross-sectional shapes ensure that the filaments in the filament bundle are only in a line contact with each other, but not in an area contact. Due to the line contact, narrow spaces are formed between the pluralities of filaments on its own which promote the capillary action required for conveying the aerosol-forming liquid.

The plurality of first filaments may be surface treated. In particular, the plurality of first filaments may comprise at least partially a surface coating, for example, an aerosolization enhancing surface coating, a liquid-adhesive surface coating, a liquid repellent surface coating, or an antibacterial surface coating. The aerosolization enhancing surface coating advantageously may enhance the variety of a user's experience. The liquid adhesive surface coating may be beneficial with regard to an enhancement of the capillary action of the filament bundle. The antibacterial surface coating may serve to reduce a bacterial contamination. A liquid repellent coating, in particular at an extremity of the filaments, may avoid liquid dropping.

Depending on the available space, the dimensions of the filaments and the amount of aerosol-forming liquid to be conveyed and heated, the plurality of first filaments in the filament bundle may comprise 3 to 100 first filaments, in particular 10 to 80 first filaments, preferably 20 to 60 first filaments, more preferably 30 to 50 first filaments, for example 40 first filaments.

In addition to the plurality of first filaments, the filament bundle may further comprise a plurality of second filaments including a second susceptor material, wherein along at least the parallel-bundle portion of the filament bundle the plurality of second filaments are arranged parallel to each other and to the plurality of first filaments. While the first susceptor material of the plurality of first filaments may be optimized with regard to heat loss and thus heating efficiency, the second susceptor material may be advantageously used as temperature marker. For this, the second susceptor material preferably comprises one of a ferrimagnetic material or a ferromagnetic material. In particular, the second susceptor material may be chosen such as to have a Curie temperature corresponding to a predefined heating temperature of the susceptor assembly. At its Curie temperature, the magnetic properties of the second susceptor material change from ferromagnetic or ferrimagnetic to paramagnetic, accompanied by a temporary change of its electrical resistance. Thus, by monitoring a corresponding change of the electrical current absorbed by the induction source it can be detected when the second susceptor material has reached its Curie temperature and, thus, when the predefined heating temperature has been reached.

Preferably, the first susceptor material is different from the second susceptor material.

The second susceptor material preferably has a Curie temperature that is lower than 500 degree Celsius. In particular, the second susceptor material may have a Curie temperature below 350 degree Celsius, preferably below 300 degree Celsius, more preferably below 250 degree Celsius, even more preferably below 200 degree Celsius, most preferably below 150 degree Celsius. Preferably, the Curie temperature is chosen such as to be below the boiling point of the aerosol-forming liquid to be vaporized in order to prevent the generation of hazardous components in the aerosol.

Suitable materials for the second susceptor material may include nickel and certain nickel alloys. Likewise, the second susceptor material may comprise one of mu-metal or permalloy. In particular, the second susceptor material may have a relative maximum magnetic permeability of at least 80 or at least 100, more particularly at least 1000, preferably at least 10000 for frequencies up to 50 kHz and a temperature of 25 degrees Celsius.

Apart from that, the plurality of second filaments may have the same or similar properties as described before with regard to the plurality of first filaments.

Accordingly, the plurality of second filaments may be solid material filaments. Furthermore, the plurality of second filaments may be single grade material filaments. In particular, the plurality of second filaments may be made of the second susceptor material.

Likewise, the plurality of second filaments may be surface treated. In particular, the plurality of second filaments may comprise a surface coating, for example, an aerosolization enhancing surface coating, a liquid-adhesive surface coating, a liquid repellent surface coating, or an antibacterial surface coating.

Furthermore, at least one of, in particular each of the plurality of second filaments may have a circular, an ellipsoidal, an oval, a triangular, a rectangular, a quadratic, a hexagonal or a polygonal cross-section.

For the same reasons as discussed above with regard to the plurality of first filaments, the plurality of second filaments may have a diameter of at least 0.015 millimeter, at least 0.02 millimeter, at least 0.025 millimeter at least 0.05 millimeter, at least 0.075 millimeter, at least 0.1 millimeter, at least 0.125 millimeter, at least 0.15 millimeter, at least 0.2 millimeter, at least 0.3 millimeter or at least 0.4 millimeter. Likewise, the plurality of second filaments may have a diameter of at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter.

In general, the plurality of first filaments and the plurality of second filaments may have the same diameter. As a consequence, the capillary action and the shear rate are uniform throughout the filament bundle. Vice versa, it is also possible that the plurality of first filaments and the plurality of second filaments have a different diameter. Different filament diameters may be used to vary the capillary action throughout the filament bundle.

The plurality of second filaments in the filament bundle may comprise 1 to 100 second filaments, in particular 10 to 80 second filaments, preferably 20 to 60 second filaments, more preferably 30 to 50 second filaments, for example 40 second filaments.

In general, the number of first filaments may be the same as the number of second filaments. However, is also possible that the number of first filaments is different from the number of second filaments. In particular, the number of first filaments may be larger, for example two times or three times or four times or five times or six times or seven times or eight times or nine times or ten times larger than the number of second filaments. This particular holds in case the second filaments are used as temperature makers for which a small number of second filaments is sufficient.

The total number of filaments in the filament bundle may be in a range between 3 and 100 filaments, in particular between 10 and 80 filaments, preferably between 20 and 60 filaments, more preferably between 30 and 50 filaments, for example 40 filaments.

The plurality of first filaments and the plurality of second filaments may be substantially equally distributed throughout the filament bundle. A uniform distribution may support a uniform capillary action throughout the filament bundle. Alternatively, it is also possible that the plurality of first filaments and the plurality of second filaments are unequally distributed throughout the filament bundle. For example, the plurality of second filaments may (only) be arranged within a center portion of the filament bundle surrounded by the plurality of first filaments. That is, the plurality of second filaments may form a core portion of the filament bundle and the plurality of first filaments form a sleeve portion of the filament bundle surrounding the core portion. Such a configuration may be advantageous in case the conveying and heating function of the filament bundle is primarily provided by the plurality of first filaments, whereas the plurality of second filaments only serves as temperature marker. Vice versa, the plurality of first filaments may (only) be arranged within a center portion of the filament bundle surrounded by the plurality of second filaments. That is, the plurality of first filaments may form a core portion of the filament bundle and the plurality of second filaments may form a sleeve portion of the filament bundle surrounding the core portion. Likewise, the plurality of first filaments may be arranged in a first portion, in particular in a first half of the filament bundle, whereas the plurality of second filaments may be arranged in a second portion, in particular in a second half of the filament bundle laterally adjacent to the first portion, in particular to the first half. Such a configuration is particularly easy to manufacture. Alternatively, the plurality of second filaments may be randomly distributed throughout the filament bundle. Furthermore, it is possible that the plurality of second filaments may have a length that is different from a length of the plurality of first filaments. In particular, a length of the plurality of second filaments may be shorter than a length of the plurality of first filaments. Vice versa, a length of the plurality of second filaments may be larger than a length of the plurality of first filaments.

In the parallel-bundle portion, the mean center-to-center distance between adjacent first filaments and—if present—second filaments is at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter. These values of the center-to-center distance are particularly suitable to ensure a sufficient capillary action.

As mentioned above, one section of the filament bundle may be configured to be immersed into a liquid reservoir: This section may be denoted as soaking section and may be arranged at one end portion of the filament bundle. From there aerosol-forming liquid is conveyed into another section of the filament bundle which is arranged outside the reservoir, in particular at the other end portion of the filament bundle. There, the conveyed liquid may be vaporized by inductive heating and exposed to an air path to be drawn out as an aerosol. Accordingly, this section may be denoted as heating section. While in use the heating section is heated up to temperatures sufficient to vaporize the aerosol-forming liquid, the soaking section preferably shall remain at temperatures well below the vaporization temperature in order to avoid boiling of the aerosol-forming liquid in the liquid reservoir. Hence, in use the filament bundle comprises a temperature profile along its length extension with sections of higher and lower temperatures. In particular, the filament bundle may comprise a temperature profile showing a temperature increase from the soaking section to the heating section, in particular from temperatures below a vaporization temperature to temperatures above the respective vaporization temperature.

As used herein, the term "heating section" denotes a section of the susceptor assembly which is configured to be exposed to an alternating magnetic field in order to vaporize the aerosol-forming liquid in order to be inductively heated. Likewise, the term "soaking section" denotes a section of the susceptor assembly which is configured to be immersed into a liquid reservoir.

The temperature profile actually forming up in use of the susceptor assembly depends on—inter alia—the thermal conductivity and the length of the filament bundle. A sufficient temperature gradient between a soaking section and a heating section of the filament bundle requires a certain distance between the soaking section and the heating section. Hence, a certain total length of the filament bundle is required to have the temperature in the soaking section below the vaporization temperature.

Accordingly, a total length of the filament bundle may be in a range between 5 millimeter and 50 millimeter, in particular between 10 millimeter and 40 millimeter, preferably between 10 millimeter and 30 millimeter, more preferably between 10 millimeter and 20 millimeter.

The filament bundle may further comprise a fan-out portion at at least one end portion of the filament bundle, in which the plurality of first filaments and—if present—the plurality of second filaments diverge from each other. Such a fan-out portion may prove beneficial to facilitate the exposure of the vaporized aerosol-forming liquid into an air path and thus to facilitate the formation of an aerosol. It is possible, that the filament bundle may comprise two fan-out portions, one at each end portion of the filament bundle.

At at least one end portion, the filament bundle may further comprise tapered portion in which a length the filaments gradually decreases from a center to the outer part of the bundle. The tapered portion may have a sharpened pencil-like shape. The tapered portion may be achieved, for example, by cutting the filaments at at least one end portion of the filament bundle at an angle. The tip geometry of the tapered portion may help carrying away the vaporized aerosol-forming liquid. In addition, the tapered portion may actively contribute to the conveyance of liquid by aligning the external airflow at the tapered portion with the tip geometry in a manner so as to create a pressure drop due to the Bernoulli principle.

Preferably, a heating section of the filament bundle is located at least partially at the fan-out portion, in particular overlaps at least partially with the fan-out portion.

The fan-out portion may have a length of at least 5 percent, 10 percent, 20 percent, or 30 percent of a total length of the filament bundle. Vice versa, the fan-out portion may have a length of at most 10 percent, 20 percent, 30 percent, 40 percent, or 50 percent of a total length of the filament bundle. Likewise, the parallel-bundle portion may have a length of at least 5 percent, 10 percent, 20 percent, 30 percent, 40 percent, 50 percent, 60 percent, 70 percent, or 80 percent of the total length of the filament bundle. Vice versa, the parallel-bundle portion may have a length of at most 10 percent, 20 percent, 30 percent, 40 percent, 50 percent, 60 percent, 70 percent, 80 percent, 90 percent or 100 percent of the total length of the filament bundle. In the latter case, where the parallel-bundle portion has a length of 100 percent of the total length of the filament bundle, the parallel-bundle portion entirely extends along the filament bundle. Accordingly, in this configuration, the filament bundle does not comprise a fan-out portion.

Preferably, a soaking section of the filament bundle is located at least partially at the parallel-bundle portion, in particular overlaps at least partially with the parallel-bundle portion.

The parallel-bundle portion may be located at least partially at one end portion of the filament bundle. In this configuration, the parallel-bundle portion may be utilized to realize a soaking section at one end of the filament bundle.

Alternatively, the parallel-bundle portion may be located between two ends of the filament bundle, for example between two fan-out portions. In particular, the parallel-bundle portion may be symmetrically located between two ends of the filament bundle, for example between two fan-out portions. In this configuration, the filament bundle may have two fan-out portions, one at each end portion of the filament bundle. In particular, this configuration may be utilized to realize either two heating sections or two soaking sections, with each end portion of the filament bundle. Alternatively, in this configuration, one end portion may realize a soaking section, whereas the other end portion may realize a heating section. The parallel-bundle portion may be located, in particular symmetrically located between any of these sections.

In order to keep the filaments together in a parallel configuration, at least part of the parallel-bundle portion may be bunched by a ferrule or a bushing or a harness. The ferrule or the bushing or the harness may comprise a sheath member. For example, the bushing may be a separating wall separating a liquid reservoir from a vaporization zone. Likewise, the at least part of the parallel-bundle portion may be bunched by a gasket or an O-ring. The filaments may be kept together by crimping or overmolding, that is, by a crimping member or an overmolded member. It is also possible that the filaments are kept together by welding them together at one extremity of the filament bundle, preferably at an extremity of a soaking section. In this configuration, capillary action still occurs along the non-welded portion of the filament bundle.

In general, the filament bundle may be a linear filament bundle, that is, a substantially straight, non-curved or non-bent filament bundle. This configuration does not exclude little bending of the filament bundle, that is, large curvature radii along the length extension of the filament bundle. As used, large curvature radii may include curvature radii being 10 times, in particular 20 times or 50 times or particular 100 times larger than the total length of the filament bundle.

Alternatively, the filament bundle may be a curved filament bundle, that is, the filament bundle may be curved along its length extension. In this configuration, the filament bundle may have a curvature radius in a range between 0.5/Pi times and 10 times, in particular between 1/Pi times and 5 times or 2/Pi times and 2 times the total length of the filament bundle. Here, Pi denotes Archimedes' constant, that is, the ratio of the circumference to the diameter of a circle.

In general, as seen in a cross-section perpendicular to the length extension of the filament bundle, the filament bundle may have any cross-sectional shape. In particular, at least along the parallel-bundle portion the filament bundle may have a circular, an ellipsoidal, and an oval, a triangular, a rectangular, a quadratic, a hexagonal or a polygonal cross-section. In particular, circular cross-sections are easy to realize. The cross-sectional shape at least along the parallel bundle portion may be easily realized by a corresponding aperture of the ferrule or bushing or harness used to bunch the filaments.

According to another aspect of the present invention, there is provided an inductive heating assembly for conveying and inductively heating an aerosol-forming liquid. The heating assembly comprises at least one liquid-conveying susceptor assembly according to the present invention and as described herein. The heating assembly further comprises at least one induction source configured and arranged to generate an alternating magnetic field in a heating section of the at least one liquid-conveying susceptor assembly, in particular in a heating section of the filament bundle.

For generating the alternating magnetic field, the induction source may comprise at least one inductor, preferably at least one induction coil. Preferably, the induction coil is arranged at least around the heating section of the liquid-conveying susceptor assembly, in particular at least around the heating section of the filament bundle.

The at least one induction coil may be a helical coil or flat planar coil, in particular a pancake coil or a curved planar coil. Use of a flat spiral coil allows a compact design that is robust and inexpensive to manufacture. Use of a helical induction coil advantageously allows for generating a homogeneous alternating magnetic field. As used herein a "flat spiral coil" means a coil that is generally planar, wherein the axis of winding of the coil is normal to the surface in which the coil lies. The flat spiral induction can have any desired shape within the plane of the coil. For example, the flat spiral coil may have a circular shape or may have a generally oblong or rectangular shape. However, the term "flat spiral coil" as used herein covers both, coils that are planar as well as flat spiral coils that are shaped to conform to a curved surface. For example, the induction coil may be a "curved" planar coil arranged at the circumference of a preferably cylindrical coil support, for example ferrite core. Furthermore, the flat spiral coil may comprise for example two layers of a four-turn flat spiral coil or a single layer of four-turn flat spiral coil.

The at least one induction coil may be held within one of a housing of the heating assembly, or a main body or a housing of an aerosol-generating device which comprises the heating assembly.

As described further above with regard to the susceptor assembly, the heating section of the liquid-conveying susceptor assembly, in particular the heating section of the filament bundle may be located at one end portion of the filament bundle. This configuration may advantageously prevent boiling of the aerosol-forming liquid in case the filament bundle comprises a soaking section at its opposite end portion.

The length of the heating section may be chosen such as to generate a desired amount of aerosol. The shorter the heating section, the less aerosol-forming liquid is vaporized and, thus the less aerosol is generated. Accordingly, the heating section of the filament bundle may have a length of at least 5 percent, 10 percent, 20 percent, 30 percent, 40 percent, 50 percent, 60 percent, 70 percent, or 80 percent of the total length of the filament bundle. Likewise, the heating section of the filament bundle may have a length of at most 10 percent, 20 percent, 30 percent, 40 percent, 50 percent, 60 percent, 70 percent, 80 percent, 90 percent or 100 percent of the total length of the filament bundle.

The filament bundle may be arranged off-center with regard to a symmetry axis of the alternating magnetic field generated by the induction source in use of the heating assembly. Advantageously, due to the off-center arrangement, that is, an asymmetric arrangement, the filament bundle is arranged in a region of the alternating magnetic field having a higher field density as compared to a symmetric center arrangement. As a consequence, the heating efficiency advantageously is enhanced.

The induction source may comprise an alternating current (AC) generator. The AC generator may be powered by a power supply of the aerosol-generating device. The AC generator is operatively coupled to the at least one induction coil. In particular, the at least one induction coil may be integral part of the AC generator. The AC generator is configured to generate a high frequency oscillating current to be passed through the at least one induction coil for generating an alternating magnetic field. The AC current may be supplied to the at least one induction coil continuously following activation of the system or may be supplied intermittently, such as on a puff by puff basis.

Preferably, the induction source comprises a DC/AC converter connected to the DC power supply including an LC network, wherein the LC network comprises a series connection of a capacitor and the inductor.

The induction source preferably is configured to generate a high-frequency magnetic field. As referred to herein, the high-frequency magnetic field may be in the range between 500 kHz (kilo-Hertz) to 30 MHz (Mega-Hertz), in particular between 5 MHz (Mega-Hertz) to 15 MHz (Mega-Hertz), preferably between 5 MHz (Mega-Hertz) and 10 MHz (Mega-Hertz).

The heating assembly may further comprise a controller configured to control operation of the heating assembly. In particular, the controller may be configured to control operation of the induction source, preferably in a closed-loop configuration, for controlling heating of the aerosol-forming liquid to a pre-determined operating temperature. The operating temperature used for heating the aerosol-forming liquid may be in a range between 100 degree Celsius and 300 degree Celsius, in particular between 150 degree Celsius and 250 degree Celsius, for example 230 degree Celsius. These temperatures are typical operating temperatures for heating but not combusting the aerosol-forming substrate.

The controller may comprise a microprocessor, for example a programmable microprocessor, a microcontroller, or an application specific integrated chip (ASIC) or other electronic circuitry capable of providing control. The controller may comprise further electronic components, such as at least one DC/AC inverter and/or power amplifiers, for example a Class-C power amplifier or a Class-D power amplifier or Class-E power amplifier. In particular, the induction source may be part of the controller.

The controller may be or may be art of an overall controller of an aerosol-generating device which the heating assembly according to the present invention is part of.

The heating assembly may comprise a power supply, in particular a DC power supply configured to provide a DC supply voltage and a DC supply current to the induction source. Preferably, the power supply is a battery such as a lithium iron phosphate battery. As an alternative, the power supply may be another form of charge storage device such as a capacitor. The power supply may require recharging, that is, the power supply may be rechargeable. The power supply may have a capacity that allows for the storage of enough energy for one or more user experiences. For example, the power supply may have sufficient capacity to allow for the continuous generation of aerosol for a period of around six minutes or for a period that is a multiple of six minutes. In another example, the power supply may have sufficient capacity to allow for a predetermined number of puffs or discrete activations of the induction source. The power supply may be an overall power supply of an aerosol-generating device the heating assembly according to the present invention is part of.

The heating assembly may further comprise a flux concentrator arranged around at least a portion of the induction coil and configured to distort the alternating magnetic field of the at least one inductive source towards the filament bundle, in particular towards a heating section of the filament bundle, in use of the heating assembly. Preferably, the flux concentrator comprises a flux concentrator foil, in particular a multi-layer flux concentrator foil.

Further features and advantages of the heating assembly according to the present invention have already been described with regard to the susceptor assembly of the present invention and thus equally apply.

According to the invention, there is also provided an aerosol-generating article for use with an inductively heating aerosol-generating device. The article comprises at least a first liquid reservoir for storing a first aerosol-forming liquid, wherein the first liquid reservoir comprises an outlet. The article further comprises at least a first liquid-conveying susceptor assembly according to the present invention and as described herein. The first liquid-conveying susceptor assembly comprises a first filament bundle for delivering the first aerosol-forming liquid from the first liquid reservoir through the outlet into a region outside the first liquid reservoir.

As used herein, the term "aerosol-generating article" refers to a consumable for usage with an inductively heating aerosol-generating device, in particular a consumable to be discarded after a single use. For example, the article may be a cartridge to be inserted into an inductively heating aerosol-generating device. Preferably, the aerosol-generating article comprises at least a first aerosol-forming liquid that is intended to be heated rather than combusted and that, when heated, releases volatile compounds that can form an aerosol.

Preferably, the first filament bundle comprises at least one soaking section arranged in the first liquid reservoir.

The length of the soaking section may advantageously be used to a control the amount of aerosol-forming liquid to be soaked and conveyed from the liquid reservoir. Accordingly, the at least one soaking section of the first filament bundle may have a length of at most 10 percent, at most 20 percent, at most 30 percent, at most 40 percent, at most 50 percent or at most 60 percent of the total length of the first bundle. Vice versa, the at least one soaking section of the first filament bundle may have a length of at least 10 percent, at least 20 percent, at least 30 percent, at least 40 percent, at least 50 percent or at least 60 percent of the total length of the first filament bundle. In particular, the at least one soaking section of the first filament bundle may have a length of 10 percent, 20 percent, 30 percent, 40 percent, 50 percent or 60 percent of the total length of the first filament bundle.

As described further above with regard to the susceptor assembly, the soaking section of the first filament bundle may be located at one end portion of the first filament bundle. In this configuration, the first filament bundle may comprise a heating section at the opposite end portion of the first filament bundle.

Likewise, the soaking section of the first filament bundle may be located between two ends of the first filament bundle. In this configuration, both end portions of the filament bundle may be used as heating sections. For example, the first filament bundle may be curved, in particular U-shaped, V-shaped or C-shaped, wherein the soaking section forms at least partially a base of the U-shaped, V-shaped or C-shaped filament bundle.

It is also possible that the first filament bundle comprises two soaking sections, each being arranged in the first liquid reservoir. Preferably, the two soaking sections may be arranged at the end portions of the first filament bundle, one at each end. In this configuration, the first filament bundle may also be curved, in particular U-shaped, V-shaped or C-shaped, wherein each of the two soaking forms at least partially an arm of the U-shaped, V-shaped or C-shaped first filament bundle.

The aerosol-generating article may further comprise at least a second liquid reservoir for storing a second aerosol-forming liquid, wherein the second liquid reservoir comprises an outlet. In addition, the aerosol-generating article may comprise at least a second liquid-conveying susceptor assembly according to the present invention and as described herein, wherein the second liquid-conveying susceptor assembly comprises a second filament bundle for delivering the second aerosol-forming liquid from the second liquid reservoir through the outlet into a region outside the second liquid reservoir. Having more than one liquid reservoir may be used to enhance the variety of the user's experience in terms of at least one of flavor, experience duration and aerosol composition.

As described before with regard to the second filament bundle, the second filament bundle may also comprise at least one soaking section which is arranged in the second liquid reservoir. Also, the at least one soaking section of the second filament bundle may have a length of at most 10 percent, at most 20 percent, at most 30 percent, at most 40 percent, at most 50 percent or at most 60 percent of the total length of the second filament bundle. Vice versa, the at least one soaking section of the second filament bundle may have a length of at least 10 percent, at least 20 percent, at least 30 percent, at least 40 percent, at least 50 percent or at least 60 percent of the total length of the second filament bundle. In particular, the at least one soaking section of the second filament bundle may have a length of 10 percent, 20 percent, 30 percent, 40 percent, 50 percent or 60 percent of the total length of the second filament bundle.

As has been further described before with regard to the first filament bundle, the soaking section of the second filament bundle may be located at one end portion of the second filament bundle. In this configuration, the second filament bundle may comprise a heating section at the opposite end portion of the first filament bundle.

Likewise, the soaking section of the second filament bundle may be located between two ends of the second filament bundle. Accordingly, the second filament bundle may be curved, in particular U-shaped, V-shaped or C-shaped, wherein the soaking section forms at least partially a base of the U-shaped, V-shaped or C-shaped filament bundle.

It is also possible that the second filament bundle comprises two soaking sections, each being arranged in the second liquid reservoir. Preferably, the two soaking sections may be arranged at the end portions of the second filament bundle, one at each end. In this configuration, the second filament bundle may also be curved, in particular U-shaped, V-shaped or C-shaped, wherein each of the two soaking forms at least partially an arm of the U-shaped, V-shaped or C-shaped second filament bundle.

The aerosol-generating article may be an aerosol-generating article for single use or an aerosol-generating article for multiple uses. In the latter case, the aerosol-generating article may be refillable. That is, the first reservoir and—if present—the second reservoir may be refillable with a first aerosol-forming liquid and a second aerosol-forming liquid, respectively. In any configuration, the aerosol-generating article may further comprise a first aerosol-forming liquid contained in the first liquid reservoir. Likewise, the aerosol-generating article may further comprise a second aerosol-forming liquid contained in the second liquid reservoir.

In order to enhance the variety of a user's experience, the first aerosol-forming liquid may be different from the second aerosol-forming liquid. As an example, the first aerosol-forming liquid may be a water-based aerosol-forming liquid and the second aerosol-forming liquid may be an oil-based aerosol-forming liquid. It is also possible that the first aerosol-forming liquid and the second aerosol-forming liquid are the same. In this configuration, the first aerosol-forming liquid and the second aerosol-forming liquid may be vaporized one after the other in order to extend a user's experience with respect to a single aerosol-generating article.

As used herein, the term "aerosol-forming liquid" relates to a liquid capable of releasing volatile compounds that can form an aerosol upon heating the aerosol-forming liquid. The aerosol-forming liquid may contain both, solid and liquid aerosol-forming material or components. The aerosol-forming liquid may comprise a tobacco-containing material containing volatile tobacco flavor compounds, which are released from the liquid upon heating. Alternatively or additionally, the aerosol-forming liquid may comprise a non-tobacco material. The aerosol-forming liquid may further comprise an aerosol former. Examples of suitable aerosol formers are glycerin and propylene glycol. The aerosol-forming liquid may also comprise other additives and ingredients, such as nicotine or flavourants. In particular, the aerosol-forming liquid may include water, solvents, ethanol, plant extracts and natural or artificial flavors. The aerosol-forming liquid may be a water-based aerosol-forming liquid or an oil-based aerosol-forming liquid.

In addition, the article may comprise a mouthpiece. As used herein, the term "mouthpiece" means a portion of the article that is placed into a user's mouth in order to directly inhale an aerosol from the article. Preferably, the mouthpiece comprises a filter. The filter may be used to filter out undesired components of the aerosol. The filter may also comprise an add-on material, for example, a flavor material to be added to the aerosol.

The article may have a simple design. The article may have a housing comprising the first liquid reservoir and—if present—the second liquid reservoir. The housing is preferably a rigid housing comprising a material that is impermeable to liquid. As used herein "rigid housing" means a housing that is self-supporting. The housing may comprise or may be made of one of PEEK (polyether ether ketone), PP (polypropylene), PE (polyethylene) or PET (polyethylene terephthalate). PP, PE and PET are particularly cost-effective and easy to mold, in particular to extrude. The aerosol-forming substrate is a substrate capable of releasing volatile compounds that can form an aerosol. The housing may also comprise flexible sections or collapsed sections. The housing may further comprise at least one breather hole for volume compensation.

Further features and advantages of the aerosol-generating article according to the present invention have already been described with regard to the susceptor assembly of the present invention and thus equally apply.

According to the invention, there is also provided an aerosol-generating system comprising an inductively heating aerosol-generating device, an aerosol-generating article for use with the aerosol-generating device, and an inductive heating assembly according to the present invention and as described herein. The induction source of the heating assembly may be part of the inductively heating aerosol-generating device, and the liquid-conveying susceptor assembly of the heating assembly may be part of the aerosol-generating article. In other words, there is also provided an aerosol-generating system comprising an inductively heating aerosol-generating device and an aerosol-generating article for use with the aerosol-generating device, wherein the article comprises at least one liquid-conveying susceptor assembly according to present invention and as described herein, and wherein the device comprises at least one induction source configured and arranged to generate an alternating magnetic field in a heating section of the at least one liquid-conveying susceptor assembly of the article, in particular in a heating section of the filament bundle, when the article is in use with the device. In particular, the at least one induction source may be an induction source as described above with respect to the induction source of the inductive heating assembly according to the present invention. The at least one induction source of the aerosol-generating device and the at least one liquid-conveying susceptor assembly of the aerosol-generating article may together form an inductive heating assembly according to the present invention and as described herein. If present, a controller of the heating assembly may be part of aerosol-generating device, in particular arranged in the aerosol-generating device. Preferably, a controller of the aerosol-generating device may include or may be a controller of the heating assembly. In particular, the aerosol-generating device may comprise a controller as described above with respect to the induction source of the inductive heating assembly according to the present invention.

Likewise, if present, a power supply of the heating assembly may be part of aerosol-generating device, in particular arranged in the aerosol-generating device. Preferably, a power supply of the aerosol-generating device may include or may be a power supply of the heating assembly. In particular, the aerosol-generating device may comprise a power supply as described above with respect to the induction source of the inductive heating assembly according to the present invention.

As used herein, the term "aerosol-generating device" is used to describe an electrically operated device that is capable of interacting with at least one aerosol-generating article including at least one aerosol-forming liquid such as to generate an aerosol by inductively heating the susceptor assembly and thus the aerosol-forming liquid within the article. Preferably, the aerosol-generating device is a puffing device for generating an aerosol that is directly inhalable by a user through the user's mouth. In particular, the aerosol-generating device is a hand-held aerosol-generating device.

The aerosol-generating device may comprise a receiving cavity for removably receiving at least a portion of the aerosol-generating article.

The induction coil of the induction source may be arranged such as to surround at least a portion of the receiving cavity, in particular such as to surround at least a portion of the filament bundle of the aerosol-generating article, in particular a heating section of the filament bundle, when the aerosol-generating article is received in the receiving cavity.

Besides the specific configuration of the susceptor assembly of the heating assembly, the aerosol-generating article of the aerosol-generating system may be an aerosol-generating article according to the present invention and as described above.

Further features and advantages of the aerosol-generating system according to the present invention have been described with regard to susceptor assembly, the aerosol-generating article and the heating assembly according to the present invention and therefore equally apply.

The invention is defined in the claims. However, below there is provided a non-exhaustive list of non-limiting examples. Any one or more of the features of these examples may be combined with any one or more features of another example, embodiment, or aspect described herein.

Example Ex1: A liquid-conveying susceptor assembly for conveying and inductively heating an aerosol-forming liquid under the influence of an alternating magnetic field, the susceptor assembly comprising a filament bundle, the filament bundle comprising at least a plurality of first filaments including a first susceptor material, wherein along at least a parallel-bundle portion of the filament bundle the plurality of first filaments are arranged parallel to each other.

Example Ex2: The susceptor assembly according to example Ex1, wherein the filament bundle is an unstranded filament bundle.

Example Ex3: The susceptor assembly according to any one of the preceding examples, wherein the plurality of first filaments are solid material filaments.

Example Ex4: The susceptor assembly according to any one of the preceding examples, wherein the plurality of first filaments are single grade material filaments.

Example Ex5: The susceptor assembly according to any one of the preceding examples, wherein the plurality of first filaments are made of the first susceptor material.

Example Ex6: The susceptor assembly according to any one of the preceding examples, the first susceptor material comprises or is made of one of a ferrimagnetic material, or a ferromagnetic material, or an electrically conductive material, or electrically conductive ferrimagnetic material or electrically conductive ferromagnetic material.

Example Ex7: The susceptor assembly according to any one of the preceding examples, wherein the first susceptor material comprises or is made of one of a ferrite, aluminum, iron, nickel, copper, bronze, cobalt, a nickel alloy, plain-carbon steel, stainless steel, ferritic stainless steel, ferromagnetic stainless steel, martensitic stainless steel, or austenitic stainless steel.

Example Ex8: The susceptor assembly according to any one of the preceding examples, wherein the plurality of first filaments have a diameter of at least 0.015 millimeter, at least 0.02 millimeter, at least 0.025 millimeter at least 0.05 millimeter, at least 0.075 millimeter, at least 0.1 millimeter, at least 0.125 millimeter, at least 0.15 millimeter, at least 0.2 millimeter, at least 0.3 millimeter or at least 0.4 millimeter.

Example Ex9: The susceptor assembly according to any one of the preceding examples, wherein the plurality of first filaments have a diameter of at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter.

Example Ex10: The susceptor assembly according to any one of the preceding examples, wherein at least one of, in particular each one of the plurality of first filaments has a circular, an ellipsoidal, an oval, a triangular, a rectangular, a quadratic, a hexagonal or a polygonal cross-section.

Example Ex11: The susceptor assembly according to any one of the preceding examples, wherein the plurality of first filaments are surface treated, in particular comprise a surface coating, for example, an aerosolization enhancing surface coating, a liquid-adhesive surface coating, a liquid repellent surface coating, or an anti-bacterial surface coating.

Example Ex12: The susceptor assembly according to any one of the preceding examples, wherein the plurality of first filaments in the filament bundle comprises 3 to 100 first filaments, in particular 10 to 80 first filaments, preferably 20 to 60 first filaments, more preferably 30 to 50 first filaments, for example 40 first filaments.

Example Ex13: The susceptor assembly according to any one of the preceding examples, wherein the filament bundle further comprises a plurality of second filaments including a second susceptor material, wherein along at least the parallel-bundle portion of the filament bundle the plurality of second filaments are arranged parallel to each other and to the plurality of first filaments.

Example Ex14: The susceptor assembly according to example Ex13, wherein the second susceptor material comprises one of a ferrimagnetic material or a ferromagnetic material.

Example Ex15: The susceptor assembly according to any one of examples Ex13 or Ex14, wherein the second susceptor material has a Curie temperature below 500 degree Celsius, in particular below 350 degree Celsius, preferably below 300 degree Celsius, more preferably below 250 degree Celsius, even more preferably below 200 degree Celsius, most preferably below 150 degree Celsius.

Example Ex16: The susceptor assembly according to any one of examples Ex13 to Ex15, wherein the second susceptor material comprises one of nickel, a nickel alloy, mu-metal or permalloy.

Example Ex17: The susceptor assembly according to any one of examples Ex13 to Ex16, wherein the plurality of second filaments are solid material filaments.

Example Ex18: The susceptor assembly according to any one of examples Ex13 to Ex17, wherein the plurality of second filaments are single grade material filaments.

Example Ex19: The susceptor assembly according to any one of examples Ex13 to Ex18, wherein the plurality of second filaments are made of the second susceptor material.

Example Ex20: The susceptor assembly according to any one of examples Ex13 to Ex19, wherein the plurality of second filaments are surface treated, in particular comprise a surface coating, for example, an aerosolization enhancing surface coating, a liquid-adhesive surface coating, a liquid repellent surface coating, or an anti-bacterial surface coating.

Example Ex21: The susceptor assembly according to any one of examples Ex13 to Ex20, wherein at least one of, in particular each of the plurality of second filaments has a circular, an ellipsoidal, an oval, a triangular, a rectangular, a quadratic, a hexagonal or a polygonal cross-section.

Example Ex22: The susceptor assembly according to any one of examples Ex13 to Ex21, wherein the plurality of second filaments have a diameter of at least 0.015 millimeter, at least 0.02 millimeter, at least 0.025 millimeter at least 0.05 millimeter, at least 0.075 millimeter, at least 0.1 millimeter, at least 0.125 millimeter, at least 0.15 millimeter, at least 0.2 millimeter, at least 0.3 millimeter or at least 0.4 millimeter.

Example Ex23: The susceptor assembly according to any one of examples Ex13 to Ex22, wherein the plurality of second filaments have a diameter of at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter.

Example Ex24: The susceptor assembly according to any one of examples Ex13 to Ex23, wherein the plurality of first filaments and the plurality of second filaments have the same diameter.

Example Ex25: The susceptor assembly according to any one of examples Ex13 to Ex23, wherein the plurality of first filaments and the plurality of second filaments have a different diameter.

Example Ex26: The susceptor assembly according to any one of examples Ex13 to Ex25, wherein the plurality of second filaments in the filament bundle 1 to 100 second filaments, in particular 10 to 80 second filaments, preferably 20 to 60 second filaments, more preferably 30 to 50 second filaments, for example 40 second filaments.

Example Ex27: The susceptor assembly according to any one of examples 13 to 26, wherein the plurality of first filaments and the plurality of second filaments are substantially equally distributed throughout the filament bundle.

Example Ex28: The susceptor assembly according to any one of examples 13 to 26, wherein the plurality of first filaments and the plurality of second filaments are unequally distributed throughout the filament bundle.

Example Ex29: The susceptor assembly according to any one of the preceding examples, wherein in the parallel-bundle portion, the mean center-to-center distance between adjacent first filaments and—if present—second filaments is at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter.

Example Ex30: The susceptor assembly according to any one of the preceding examples, wherein a total length of the filament bundle is a range between 5 millimeter and 50 millimeter, in particular between 10 millimeter and 40 millimeter, preferably between 10 millimeter and 30 millimeter, more preferably between 10 millimeter and 20 millimeter.

Example Ex31: The susceptor assembly according to any one of the preceding examples, wherein the filament bundle comprises a fan-out portion at at least one end portion of the filament bundle, in which the plurality of first filaments and—if present—the plurality of second filaments diverge from each other.

Example Ex32: The susceptor assembly according to example Ex31, wherein the fan-out portion has a length of at least 5 percent, 10 percent, 20 percent, or 30 percent of a total length of the filament bundle.

Example Ex33: The susceptor assembly according to example Ex31 or example Ex32, wherein the fan-out portion has a length of at most 10 percent, 20 percent, 30 percent, 40 percent, or 50 percent of a total length of the filament bundle.

Example Ex34: The susceptor assembly according to any one of the preceding examples, wherein the parallel-bundle portion has a length of at least 5 percent, 10 percent, 20 percent, 30 percent, 40 percent, 50 percent, 60 percent, 70 percent, or 80 percent of the total length of the filament bundle.

Example Ex35: The susceptor assembly according to any one of the preceding examples, wherein the parallel-bundle portion has a length of at most 10 percent, 20 percent, 30 percent, 40 percent, 50 percent, 60 percent, 70 percent, 80 percent, 90 percent or 100 percent of the total length of the filament bundle.

Example Ex36: The susceptor assembly according to any one of the preceding examples, wherein the parallel-bundle portion is located at one end portion of the filament bundle.

Example Ex37: The susceptor assembly according to any one of examples 1 to 36, wherein the parallel-bundle portion is located, in particular symmetrically located between two ends of the filament bundle.

Example Ex38: The susceptor assembly according to any one of the preceding examples, wherein at least part of the parallel-bundle portion is bunched by a ferrule or a bushing or a harness.

Example Ex39: The susceptor assembly according to example Ex38, wherein the ferrule or the bushing or the harness comprises a sheath member.

Example Ex40: The susceptor assembly according to any one of the preceding examples, wherein the filament bundle is a linear [non-curved, non-bent] filament bundle.

Example Ex41: The susceptor assembly according to any one of the preceding examples, wherein at least along the parallel-bundle portion the filament bundle has a circular, an ellipsoidal, oval, triangular, rectangular, quadratic, hexagonal or polygonal cross-section.

Example Ex42: The susceptor assembly according to any one of the preceding examples, wherein a length of the plurality of second filaments is different from a length of the plurality of first filaments.

Example Ex43: The susceptor assembly according to any one of examples Ex1 to Ex42, wherein a length of the plurality of second filaments is shorter than the length of the plurality of first filaments.

Example Ex44: The susceptor assembly according to any one of examples Ex1 to Ex42, wherein a length of the plurality of second filaments is larger than the length of the plurality of first filaments.

Example Ex45: An inductive heating assembly for conveying and inductively heating an aerosol-forming liquid, wherein the heating assembly comprises:

at least one liquid-conveying susceptor assembly according to any one of the preceding examples;

at least one induction source configured and arranged to generate an alternating magnetic field in a heating section of the at least one liquid-conveying susceptor assembly, in particular in a heating section of the filament bundle.

Example Ex46: The heating assembly according to example Ex45, wherein the induction source comprises an induction coil arranged at least around the heating section of the liquid-conveying susceptor assembly, in particular at least around the heating section of the filament bundle.

Example Ex47: The heating assembly according to any one of examples Ex45 or Ex46, wherein the heating section of the liquid-conveying susceptor assembly, in particular the heating section of the filament bundle is located at one end portion of the filament bundle.

Example Ex48: The heating assembly according to any one of examples Ex45 to Ex47, wherein the heating section of the filament bundle has a length of at least 5 percent, 10 percent, 20 percent, 30 percent, 40 percent, 50 percent, 60 percent, 70 percent, or 80 percent of the total length of the filament bundle.

Example Ex49: The heating assembly according to any one of examples Ex45 to Ex48, wherein the heating section of the filament bundle has a length of at most 10 percent, 20 percent, 30 percent, 40 percent, 50 percent, 60 percent, 70 percent, 80 percent, 90 percent or 100 percent of the total length of the filament bundle.

Example Ex50: The heating assembly according to any one of examples Ex45 to Ex49, wherein the filament bundle is arranged off-center with regard to a symmetry axis of the alternating magnetic field generated by the induction source in use of the heating assembly.

Example Ex51: The heating assembly according to any one of examples Ex45 to Ex50, wherein the heating assembly further comprises a flux concentrator arranged around at least a portion of the induction coil and configured to distort the alternating magnetic field of the at least one inductive source towards the filament bundle, in particular towards a heating section of the filament bundle, in use of the heating assembly.

Example Ex52: The heating assembly according to example Ex51, wherein the flux concentrator comprises a flux concentrator foil, in particular a multi-layer flux concentrator foil.

Example Ex53: An aerosol-generating article for use with an inductively heating aerosol-generating device, the article comprising:

at least a first liquid reservoir for storing a first aerosol-forming liquid, wherein the first liquid reservoir comprises an outlet;

at least a first liquid-conveying susceptor assembly according to any one of examples 1 to 44 comprising a first filament bundle for delivering the first aerosol-forming liquid from the first liquid reservoir through the outlet into a region outside the first liquid reservoir.

Example Ex54: The aerosol-generating article according to example Ex53, wherein the first filament bundle comprises at least one soaking section arranged in the first liquid reservoir.

Example Ex55: The aerosol-generating article according to example Ex54, wherein the at least one soaking section of the first filament bundle has a length of at most 10 percent, at most 20 percent, at most 30 percent, at most 40 percent, at most 50 percent or at most 60 percent of the total length of the second filament bundle.

Example Ex56: The aerosol-generating article according to example Ex54, wherein the at least one soaking section of the first filament bundle may have a length of at least 10 percent, 20 percent, 30 percent, 40 percent, 50 percent, or 60 percent of the total length of the first filament bundle.

Example Ex57: The aerosol-generating article according to any one of examples Ex54 to Ex56, wherein the soaking section of the first filament bundle is located at one end portion of the first filament bundle.

Example Ex58: The aerosol-generating article according to any one of examples Ex54 to Ex56, wherein the soaking section of the first filament bundle is located between two ends of the first filament bundle.

Example Ex59: The aerosol-generating article according to any one of examples Ex53 to Ex58, wherein the first filament bundle comprises two soaking sections, each being arranged in the first liquid reservoir.

Example Ex60: The aerosol-generating article according to any one of examples Ex53 to Ex59, further comprising at least a second liquid reservoir for storing a second aerosol-forming liquid, wherein the second liquid reservoir comprises an outlet;

at least a second liquid-conveying susceptor assembly according to any one of examples 1 to 44 comprising a second filament bundle for delivering the second aerosol-forming liquid from the second liquid reservoir through the outlet into a region outside the second liquid reservoir.

Example Ex61: The aerosol-generating article according to example Ex60, wherein the second filament bundle comprises at least one soaking section arranged in the second liquid reservoir.

Example Ex62: The aerosol-generating article according to example Ex61, wherein the at least one soaking section of the second filament bundle has a length of at most 10 percent, at most 20 percent, at most 30 percent, at most 40 percent, at most 50 percent or at most 60 percent of the total length of the second filament bundle.

Example Ex63: The aerosol-generating article according to example Ex61, wherein the at least one soaking section of the second filament bundle has a length of at least 10 percent, at least 20 percent, at least 30 percent, at least 40 percent, at least 50 percent or at least 60 percent of the total length of the second filament bundle.

Example Ex64: The aerosol-generating article according to any one of examples Ex61 to Ex63, wherein the soaking section of the second filament bundle is located at one end portion of the second filament bundle.

Example Ex65: The aerosol-generating article according to any one of examples Ex61 to Ex63, wherein the soaking section of the second filament bundle is located between two ends of the second filament bundle.

Example Ex66: The aerosol-generating article according to any one of examples Ex60 to Ex65, wherein the second filament bundle comprises two soaking sections, each being arranged in the second liquid reservoir.

Example Ex67: The aerosol-generating article according to any one of examples Ex60 to Ex66, further comprising a first aerosol-forming liquid contained in the first liquid reservoir.

Example Ex68: The aerosol-generating article according to any one of examples Ex60 to Ex67, further comprising a second aerosol-forming liquid contained in the second liquid reservoir.

Example Ex69: The aerosol-generating article according to example Ex68, wherein the first aerosol-forming liquid is different from the second aerosol-forming liquid.

Example Ex70: An aerosol-generating system comprising an inductively heating aerosol-generating device, an aerosol-generating article for use with the aerosol-generating device, and an inductive heating assembly according to any one of examples Ex45 to Ex52, wherein the induction source of the heating assembly is part of the inductively heating aerosol-generating device, and wherein the liquid-conveying susceptor assembly of the heating assembly is part of the aerosol-generating article.

Example Ex71: An aerosol-generating system comprising an inductively heating aerosol-generating device and an aerosol-generating article for use with the aerosol-generating device, wherein the article comprises at least one liquid-conveying susceptor assembly according to any one of examples Ex1 to Ex45, and wherein the device comprises at least one induction source configured and arranged to generate an alternating magnetic field in a heating section of the at least one liquid-conveying susceptor assembly of the article, in particular in a heating section of the filament bundle, when the article is in use with the device.

Examples will now be further described with reference to the figures in which:

FIG. 1 schematically illustrates an inductive heating assembly comprising a susceptor assembly according to a first embodiment of the present invention;

Figure 1:
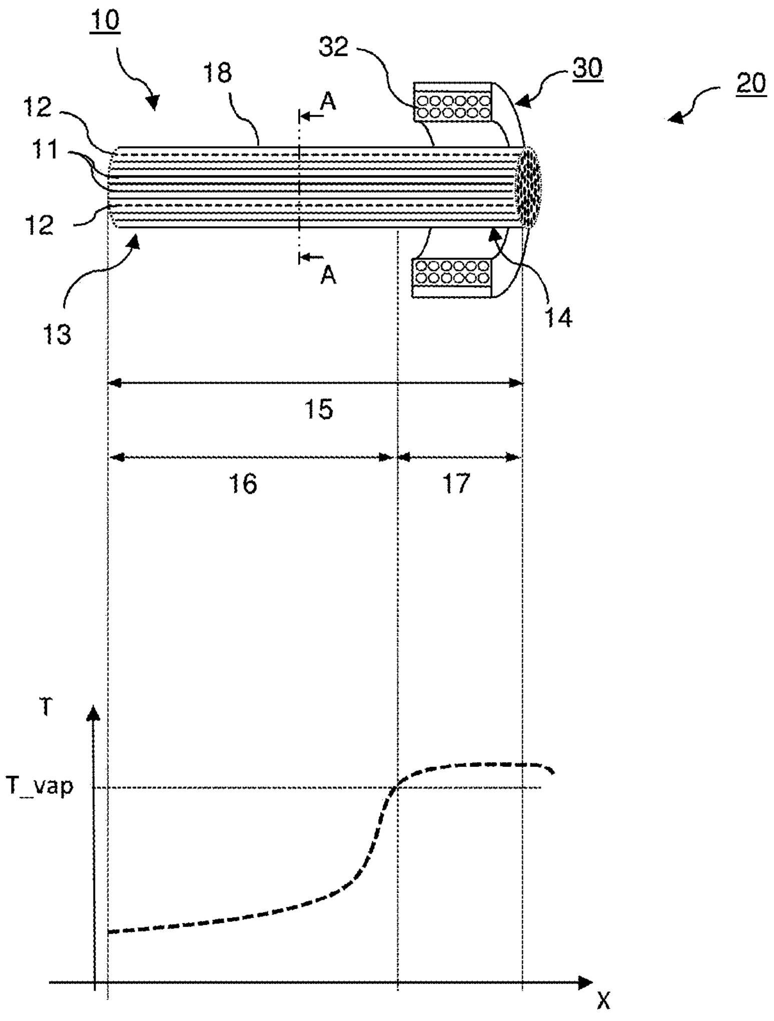
Figure 5:
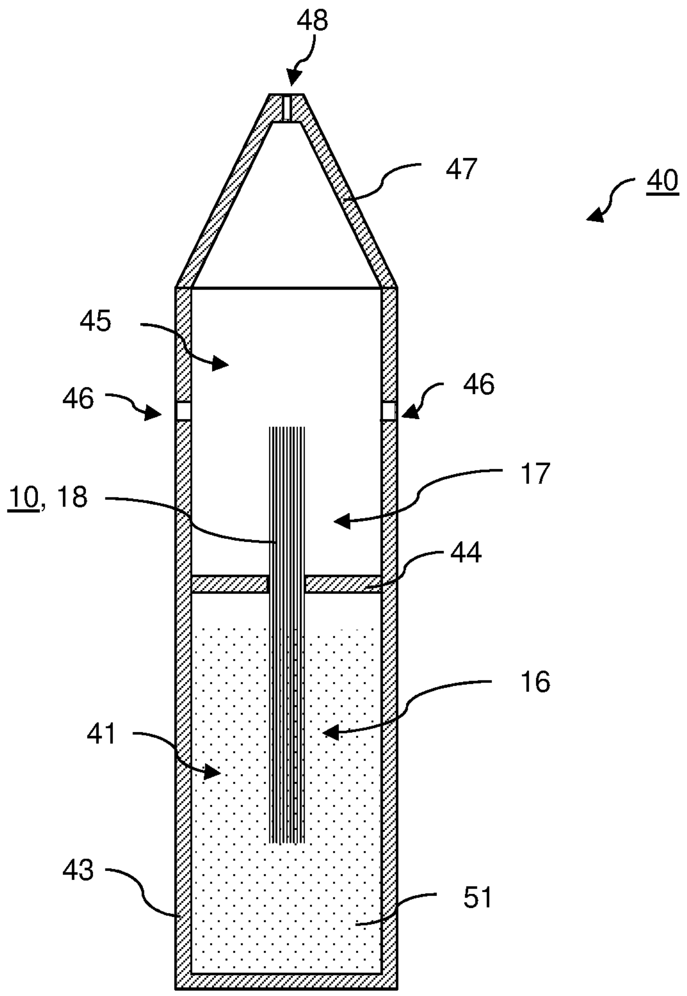
Figure 6:
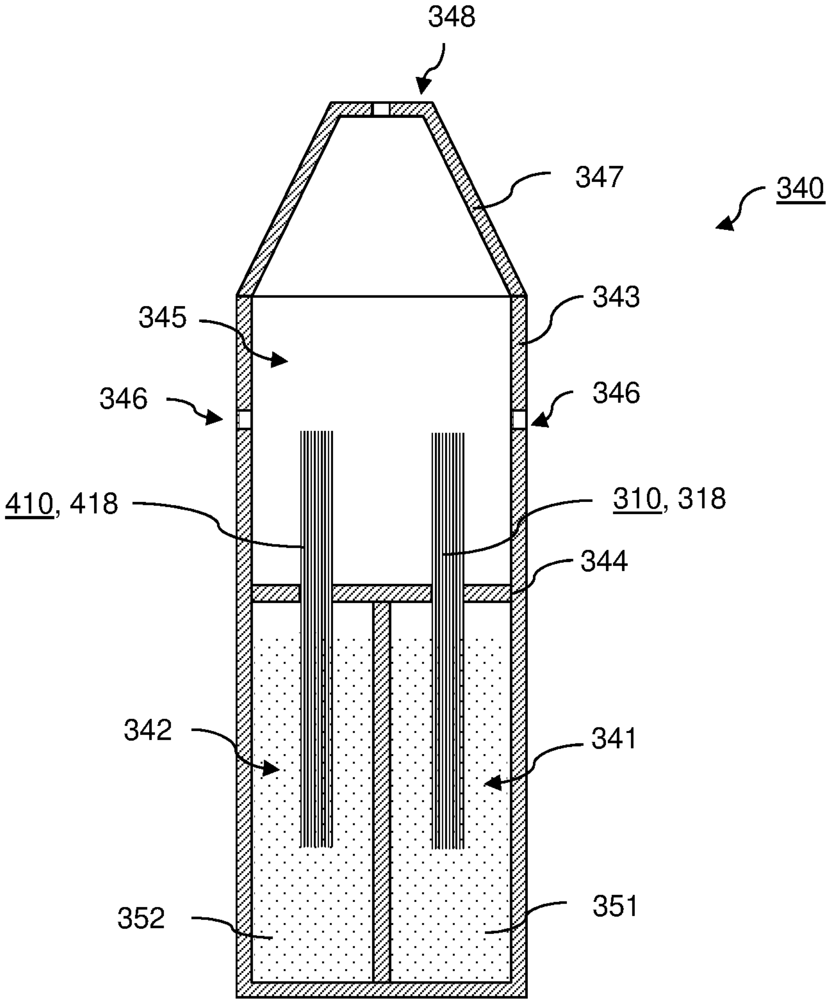
Figure 7:
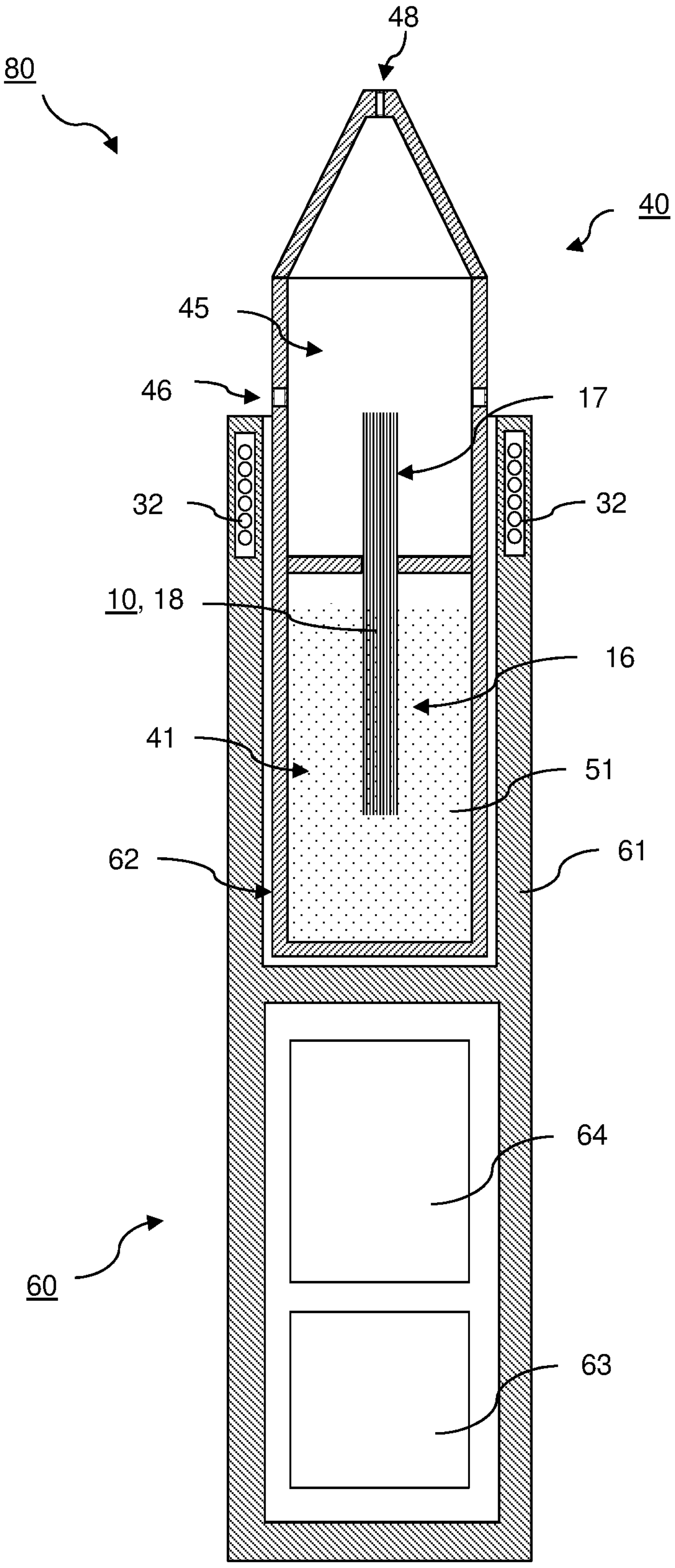

FIG. 5 schematically illustrates a first exemplary embodiment of an aerosol-generating article according to the present invention comprising a susceptor assembly according to FIG. 1;

FIG. 6 schematically illustrates a second exemplary embodiment of ab aerosol-generating article according to the present invention comprising two susceptor assemblies according to FIG. 1; and FIG. 7 schematically illustrates an exemplary embodiment of an aerosol-generating system according to the present invention comprising an aerosol-generating device and an aerosol-generating article according to FIG. 5.

FIG. 1 schematically illustrates an inductive heating assembly 20 comprising a liquid-conveying susceptor assembly 10 according to a first embodiment of the present invention. In general, the susceptor assembly 10 comprises a filament bundle 18 which is capable to perform two functions: conveying and heating aerosol-forming liquid. For that purpose, the filament bundle 18 comprises a plurality of first filaments 11 and a plurality of second filaments 12, wherein the plurality of first filaments 11 comprise a first susceptor material and the plurality of second filaments 12 comprise a second susceptor material. Due to the susceptive nature of the filament materials, the first filaments 11 and the second filaments 12 are capable to be inductively heated in an alternating magnetic field and thus to heat an aerosol-forming liquid in thermal contact with the filaments. Furthermore, due to the arrangement of the first and second filaments 11, 12 in the filament bundle 18 and due to the small diameter of the filaments 11, 12, narrow channels are formed between the filaments 11, 12 which provide capillary action along the longitudinal direction X of the filament bundle 18. Thus, as an example, if one end portion 13 of the filament bundle 18 is immersed into an aerosol-forming liquid, liquid may be conveyed to the opposite end portion 14 of the filament bundle 18, where the conveyed liquid may be vaporized and exposed to an air path to be drawn out as an aerosol.

For vaporizing the liquid, the heating assembly 20 further comprises an induction source 30 including an induction coil 32. In the present embodiment, the induction coil 32 is a double-layer helical coil, each layer having six windings, which is capable to generate a substantially homogeneous alternating magnetic field. As can be seen in FIG. 1, the induction coil 32 is arranged around the end portion 14 of the filament bundle 18 such as to generate an alternating magnetic field which locally penetrates the filament bundle 18 at its end portion 14 only. As a consequence, the filament bundle 18 is locally heated in a heating section 17 at the end portion 14. The field strength is chosen such that heating section 17 is heated up to temperature sufficient to vaporize the aerosol-forming liquid conveyed through the filament bundle 18. In contrast, due to the only local heating, the remaining section of the filament bundle 18, in particular the end portion 13 stays at temperatures below the vaporization temperature. Hence, in use of the heating assembly 20 the susceptor assembly 10 comprises a temperature profile along its length direction X with sections of higher and lower temperatures as shown in the lower part of FIG. 1. More specifically, the temperature profile shows a temperature increase from the end portion 13 to the heating section 17 at the opposite end portion 14, from temperatures below a vaporization temperature T_vap of the aerosol-forming liquid to temperatures above the respective vaporization temperature T_vap. Advantageously, having the remaining section below the vaporization temperature T_vap prevents boiling of aerosol-forming liquid within that part of the filament bundle 18. Even more, in case the remaining section 16 or at least a part of thereof is used as a soaking section 16 to be immersed into a liquid reservoir, boiling of aerosol-forming liquid within the reservoir is also prevented.

The actual temperature profile forming up in use of the susceptor assembly 10 depends on the thermal conductivity and the length of the filament bundle 18. Accordingly, in order to have sufficient temperature gradient between the end portion 13 and the end portion 14, the bundle 18 bundle requires a certain total length. With regard to the present embodiment, the total length of the filament bundle 18 may be in a range between 5 millimeter and 50 millimeter, in particular between 10 millimeter and 40 millimeter, preferably between 10 millimeter and 30 millimeter, more preferably between 10 millimeter and 20 millimeter. This applies for each filament type, that is, the plurality of first filaments 11 and the plurality of second filaments 12.

Figure 2:
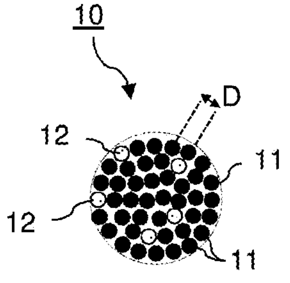
FIG. 2 shows a cross-section of the susceptor assembly of the heating assembly according to FIG. 1.

FIG. 2 shows a cross-section of the susceptor assembly 10 through the filament bundle 18 along line A-A in FIG. 1. Both, the plurality of first filaments 11 and the plurality of second filaments 12 are solid material filaments having a substantially circular cross-section. Due to the circular cross-section, the filaments 11, 12 are not in area contact, but only in a line contact with each other causing the formation of capillary spaces between the pluralities of filaments 11, 12 on its own. Other cross-sectional shapes of the plurality of first and second filaments 11, 12 of are also possible, for example, oval, elliptical triangular rectangular, quadratic, hexagonal or polygonal cross-sections.

In order to provide a sufficient capillary action, the mean center-to-center distance D between adjacent filaments 11, 12 in the filament bundle is at most 0.5 millimeter, in particular at most 0.25 millimeter, preferably at most at most 0.1 millimeter at most 0.05 millimeter, even more preferably at most 0.025 millimeter.

The capillary action is promoted also by a small radius of curvature, and thus by a small diameter of the first and second filaments 11, 12. Accordingly, the first and second filaments may have a diameter of at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter. However, the diameter of the first and second filaments 11, 12 should be still larger than twice the skin depth in order to induce a sufficient amount of eddy currents and thus to generate a sufficient amount of heat energy when the filament bundle 18 is exposed to an alternating magnetic field. Accordingly, depending on the materials and the frequency of the alternating magnetic field used, the first and second filaments 11, 12 may have a diameter of at least 0.015 millimeter, at least 0.02 millimeter, at least 0.025 millimeter at least 0.05 millimeter, at least 0.075 millimeter, at least 0.1 millimeter, at least 0.125 millimeter, at least 0.15 millimeter, at least 0.2 millimeter, at least 0.3 millimeter or at least 0.4 millimeter.

In the present embodiment, the first and second filaments 11, 12 may comprise a liquid-adhesive surface coating (not shown). The liquid adhesive surface coating further enhances capillary action of the filament bundle 18.

The first susceptor material of the plurality of first filaments 11 is optimized with regard to heat generation. For example, the first susceptor material may be a ferromagnetic stainless steel causing the plurality of first filaments 11 to be inductively heated by eddy currents as well as by hysteresis losses. The Curie temperature of the ferromagnetic first susceptor material is chosen such as to be well above the vaporization temperature, preferably above 300 degree Celsius. In contrast, as described further above, the plurality of second filaments 12 mainly serve as temperature markers. For that purpose, the second susceptor material may be a ferromagnetic or ferrimagnetic material which preferably has a Curie temperature at about a predefined operating temperature of the susceptor assembly 10. Accordingly, when the susceptor assembly 10 reaches the Curie temperature of the second susceptor material, the magnetic properties of the second susceptor material change from ferromagnetic or ferrimagnetic to paramagnetic, accompanied by a temporary change of its electrical resistance. Thus, by monitoring a corresponding change of the electrical current absorbed by the induction source 30 that is used to generate the alternating magnetic field it can be detected when the second susceptor material has reached its Curie temperature and, thus, when the predefined operating temperature has been reached. Suitable materials for the second susceptor material may be nickel, a nickel alloy, mu-metal or permalloy. To sufficiently work as temperature markers, only a few second filaments are required. Accordingly, the number of first filaments 11 may be larger, in particular two times or three times or four times or five times or six times or seven times or eight times or nine times or ten times larger than the number of second filaments 12. In the present embodiment, the filament bundle 18 exemplarily comprises forty first filaments 11 and five second filaments 12.

As can be also seen in FIG. 2, the plurality of second filaments 12 are randomly distributed throughout the filament bundle 18. Advantageously, a random distribution requires only little effort during manufacturing of the filament bundle 18. As can be further seen in FIG. 2, the filament bundle 18 has a substantially circular cross-section which is particularly easy to manufacture.

Again with reference to FIG. 1, the first and second filaments 11, 12 are arranged in parallel to each other such as to form a parallel-bundle portion 15 along the entire length extension of the filament bundle 18. That is, the filament bundle 18 of the susceptor assembly 10 is an unstranded filament bundle in which the first and second filaments 11, 12 are neither stranded nor twisted and, thus, do not cross each other. The parallel-bundle portion 15 is particularly advantageous to provide sufficient capillary action along the entire length extension of the filament bundle 18. Furthermore, a susceptor assembly comprising a parallel arrangement of filaments is easy and cost-effective to manufacture. Basically, the susceptor assembly 10 may be manufactured by bundling a plurality of individual filaments arranged in substantially parallel order and cutting the filament bundle to desired length.

Figure 3:
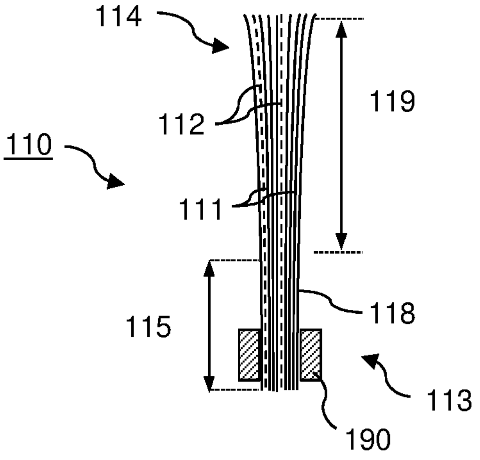
FIG. 3 shows a susceptor assembly accordingly to a second embodiment of the present invention.

FIG. 3 shows a second embodiment of the susceptor assembly 110 according to the present invention. In general, the susceptor assembly according to FIG. 3 is similar to the susceptor assembly 10 shown in FIGS. 1 and 2. Therefore, identical or similar features are denoted with the same reference signs, yet incremented by 100. In contrast to the first embodiment shown in FIGS. 1 and 2, the susceptor assembly 110 according to FIG. 3 comprises a fan-out portion 119 at the end portion 114 of the filament bundle 118, in which the first filaments 111 and second filaments 112 diverge from each other. As a consequence, the parallel-bundle portion 115 does not extend along the entire length extension of the filament bundle 118. In the present embodiment, the parallel-bundle portion 150 is located at the opposite end portion 113 of the filament bundle 118 and extends along about one third of the total length of the filament bundle 118. Accordingly, the fan-out portion extends along about two third of the total length of the filament bundle 118. The fan-out portion may facilitate the exposure of the vaporized aerosol-forming liquid into an air path and thus the formation of an aerosol. Likewise, the fan-out portion may be used at least partially as soaking section to be immersed into an aerosol-forming liquid. In order to keep the filaments 111, 112 together in a parallel configuration, at least part of the parallel-bundle portion 115 of the filament bundle 118 is bunched by a ferrule 190 or a harness. In the present embodiment, the ferrule is arranged at the end portion 113.

Figure 4:
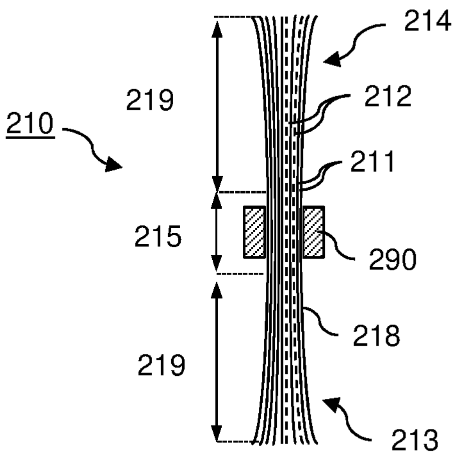
FIG. 4 shows a susceptor assembly accordingly to a third embodiment of the present invention.

FIG. 4 shows a third embodiment of a susceptor assembly 210 which is similar to the second embodiment shown in FIG. 3. Therefore identical or similar features are again denoted with the same reference signs, yet incremented by 100. In contrast to the second embodiment shown in FIG. 3, the susceptor assembly 210 according to FIG. 4 comprises two fan-out portions 219, one at each end portion 213, 214 of the filament bundle 218. Accordingly, the parallel-bundle portion 215 is located between the two fan-out portions 219. In the present embodiment, the filament bundle 118 asymmetric with regard to a symmetry axis perpendicular to the length extension of the filament bundle passing its center of mass. Each of the two fan-out portions 219 has a length of about 40 percent of the total length of the filament bundle 218, whereas the parallel-bundle portion 215 has a length of about 20 percent of the total length of the filament bundle 218. Similar to the embodiment shown in FIG. 3, the first and second filaments 211, 212 of the filament bundle 218 according to FIG. 4 are bunched by a ferrule 290 which is arranged around the parallel-bundle portion 215 at about the middle of the length extension of the filament bundle 218. The configuration according to FIG. 4 may be utilized to realize either two heating sections or two soaking sections at each end of the bundle. Alternatively, in this configuration, one fan-one portion 219 may realize a soaking section, whereas the other fan-out 219 portion may realize a heating section.

FIG. 5 schematically illustrates a first embodiment of an aerosol-generating article 40 according to the present invention. As will be described further below with regard to FIG. 7, the aerosol-generating article 40 is configured for use with an inductively heating aerosol-generating device. The article comprises 40 comprises a rigid article housing 43 made of a liquid impermeable material. Together with a bushing 44 the article housing 43 forms a liquid reservoir 41 which contains an aerosol-forming liquid 51. The bushing 44 comprises an opening forming an outlet of the liquid reservoir 41. The article 40 further comprises a liquid-conveying susceptor assembly 10 corresponding to the susceptor assembly 10 shown in FIG. 1. The filament bundle 18 of the susceptor assembly 10 passes through the opening in the bushing 44 such as to be partially arranged in the liquid reservoir 41 and partly arranged in a vaporization cavity 45 which is formed by the article housing 43 and the bushing 44 adjacent to the liquid reservoir 41. Due to this, the filament bundle 18 is capable to deliver aerosol-forming liquid 51 from the liquid reservoir 41 through the outlet into a region outside the liquid reservoir 41, that is, into the vaporization cavity 45. There, the conveyed liquid 51 may be vaporized by inductively heating that part of the filament bundle 18 which is arranged in the vaporization cavity 45. Accordingly, that part of the filament bundle 18 which is arranged in the liquid reservoir 41, in particular immersed into the aerosol-forming liquid 51 acts as a soaking section 16. The length of the soaking section 16 may be advantageously used to a control the amount of aerosol-forming liquid being soaked and conveyed from the liquid reservoir 41 into the vaporization cavity 45. In the present embodiment, the soaking section 16 has a length of about 60% of the total length of the filament bundle 18.

Likewise, that part of the filament bundle 18 which is arranged in the vaporization cavity 45 acts at least partially as a heating section 17 when being exposed an alternating magnetic field as described before with regard to FIG. 1.

As can be further seen in FIG. 5, the article 40 comprises air inlets 46 through the article housing 43 into the vaporization cavity 45 enabling air to enter into the vaporization cavity 45. The air inlet 46 may be configured to provide airflow at or around the heating section 17 of the filament bundle 18. The air inlet 46 may be a hole through the reservoir body. Likewise, the air inlet 46 may be a nozzle that is configured to direct airflow to a specific target location at the filament bundle 18. In addition, the article 41 comprises a mouthpiece 47 forming the proximal end portion of the vaporization cavity 45. The mouthpiece 47 has a tapered shape including an air outlet 48 at its very end, thus allowing a user to directly inhale an aerosol from the article. Preferably, the mouthpiece comprises a filter (not shown). Hence, when a user takes a puff, aerosol-forming liquid vaporized from the heating section 17 is exposed to the airflow having entered the vaporization cavity 45 through the air inlets 46 such as to form an aerosol which may be drawn out through the air outlet 48 in the mouthpiece 47.

In general, the aerosol-generating article 40 may be an aerosol-generating article for single use or an aerosol-generating article for multiple uses. In the latter case, the aerosol-generating article 40 may be refillable. That is, the liquid reservoir 41 may be refillable with aerosol-forming liquid 51 after depletion.

FIG. 6 shows a second embodiment of an aerosol-generating article 340 according to the present invention. Features which are similar or identical to the aerosol-generating article 40 shown in FIG. 5 are denoted with identical reference signs, yet incremented by 300. In contrast to the article 40 according to FIG. 5, the aerosol-generating article 340 according to FIG. 6 comprises two liquid reservoirs, that is, a first liquid reservoir 341 containing a first aerosol-forming liquid 351 and a second liquid reservoir 342 containing a second aerosol-forming liquid 352. For each of the reservoirs 341, 342, the article 340 comprises a separate susceptor assembly 310, 410 for conveying aerosol-forming liquid from the respective reservoir 341, 342 into a common vaporization cavity 345. Accordingly, a first susceptor assembly 310 comprising a first filament bundle 318 passes from the first liquid reservoir 341 through a corresponding opening in a bushing 344 into the vaporization cavity 345. Likewise a second susceptor assembly 410 comprising a second filament bundle 418 passes from the second liquid reservoir 342 through a corresponding opening in the bushing 344 into the vaporization cavity 345.

Both susceptor assemblies 310, 410 preferably are heated at the same time when being exposed to an alternating magnetic field. Accordingly, the first and the second aerosol-forming liquid are vaporized the same time and subsequently mixed up such as to form a composite aerosol potentially containing various substances and flavors. In particular, this applies if the first aerosol-forming liquid and the second aerosol-forming liquid different from each other. Hence, the aerosol-generating article according to FIG. 6 advantageously enhances the variety of the user's experience in terms of flavor and aerosol composition.

FIG. 7 schematically illustrates an exemplary embodiment of an aerosol-generating system 80 according to the present invention. The system 80 comprises an inductively heating aerosol-generating device 60 and an aerosol-generating article 40 for use with the device 60. In the present embodiment, the aerosol-generating article 40 corresponds to the article shown in FIG. 5. In particular, the article 40 comprises a susceptor assembly 10 for conveying and heating aerosol-forming liquid 51 contained in the article 40. The aerosol-generating device 60 is an electrically operated device that is capable of interacting with the article 40 in order to generate an aerosol by inductively heating the aerosol-forming liquid via the susceptor assembly 10. For this, the aerosol-generating device 60 comprises a receiving cavity 62 formed within the device housing 61 in a proximal portion of the device 60. The receiving cavity 62 is configured to removably receive at least a portion of the aerosol-generating article 40. For heating the susceptor assembly 10, the aerosol-generating device 60 comprises an induction source including an induction coil 32. In the present embodiment, the induction coil 32 is a single helical coil which is arranged and configured to generate a substantially homogeneous alternating magnetic field. As can be seen in FIG. 1, the induction coil 32 is arranged around the proximal end portion of the receiving cavity 62 such as to surround a portion of the filament bundle 18 when the aerosol-generating article 40 is received in the receiving cavity 62. In particular, the induction coil 32 is arranged such as to generate an alternating magnetic field that locally penetrates the filament bundle 18 only in the heating section 17. In contrast, due to the local heating, the soaking section 16 of the filament bundle 18 stays at temperatures below the vaporization temperature. Thus, boiling of aerosol-forming liquid 51 within the liquid reservoir 41 is prevented.

Together, the induction source of the aerosol-generating device 60 and the susceptor assembly 10 of the aerosol-generating article 44 form an inductive heating assembly according to the present invention.

The aerosol-generating device 60 further comprises a controller 64 for controlling operation of the aerosol-generating system 80, in particular for controlling the heating operation.

Furthermore, the aerosol-generating device 60 comprises a power supply 63 providing electrical power for generating the alternating magnetic field. Preferably, the power supply 63 is a battery such as a lithium iron phosphate battery. The power supply 63 may have a capacity that allows for the storage of enough energy for one or more user experiences.

Both, the controller 64 and the power supply 63 arranged in a distal portion of the aerosol-generating device 60.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A±5 percent of A. Within this context, a number A may be considered to include numerical values that are within general standard error for the measurement of the property that the number A modifies. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. A liquid-conveying susceptor assembly for conveying and inductively heating an aerosol-forming liquid under an influence of an alternating magnetic field, the susceptor assembly comprising a filament bundle, the filament bundle comprising at least a plurality of first filaments including a first susceptor material, wherein along at least a parallel-bundle portion of the filament bundle the plurality of first filaments are arranged parallel to each other, wherein the filament bundle further comprises a fan-out portion at least one end portion of the filament bundle in which the plurality of first filaments diverge from each other to facilitate exposure of vaporized aerosol-forming liquid into an air path.

2. The liquid-conveying susceptor assembly according to claim 1, wherein the filament bundle further comprises a plurality of second filaments including a second susceptor material, and wherein along at least the parallel-bundle portion of the filament bundle the plurality of second filaments are arranged parallel to each other and to the plurality of first filaments.

3. The liquid-conveying susceptor assembly according to claim 2, wherein the second susceptor material comprises one of a ferrimagnetic material or a ferromagnetic material.

4. The liquid-conveying susceptor assembly according to claim 2, wherein the first filaments of the plurality of first filaments and the second filaments of the plurality of second filaments have a diameter of at most 0.025 millimeter.

5. The liquid-conveying susceptor assembly according to claim 2, wherein the first filaments of the plurality of first filaments and the second filaments of the plurality of second filaments have a diameter of at most 0.5 millimeter.

6. The liquid-conveying susceptor assembly according to claim 2, wherein the plurality of first filaments and the plurality of second filaments are surface treated and comprise an aerosolization enhancing surface coating, a liquid-adhesive surface coating, a liquid repellent surface coating, or an antibacterial surface coating.

7. The liquid-conveying susceptor assembly according to claim 2, wherein the plurality of first filaments in the filament bundle comprises 3 to 100 first filaments, and wherein the plurality of second filaments in the filament bundle comprises 2 to 100 second filaments.

8. The liquid-conveying susceptor assembly according to claim 2, wherein the plurality of first filaments in the filament bundle comprises 30 to 50 first filaments, and wherein the plurality of second filaments in the filament bundle comprises 30 to 50 second filaments.

9. The liquid-conveying susceptor assembly according to claim 2, wherein in the parallel-bundle portion, a mean center-to-center distance between adjacent first filaments and second filaments is at most 0.025 millimeter.

10. The liquid-conveying susceptor assembly according to claim 2, wherein in the parallel-bundle portion, a mean center-to-center distance between adjacent first filaments and second filaments is at most 0.5 millimeter.

11. The liquid-conveying susceptor assembly according to claim 2, wherein, in the fan-out portion, the plurality of first filaments and the plurality of second filaments diverge from each other.

12. The liquid-conveying susceptor assembly according to claim 1, wherein the parallel-bundle portion has a length of at least 5 percent of a total length of the filament bundle.

13. The liquid-conveying susceptor assembly according to claim 1, wherein the parallel-bundle portion has a length of at least 80 percent of a total length of the filament bundle.

14. The liquid-conveying susceptor assembly according to claim 1, wherein the parallel-bundle portion is located at one end portion of the filament bundle, or wherein the parallel-bundle portion is symmetrically located between two ends of the filament bundle.

15. The liquid-conveying susceptor assembly according to claim 1, wherein at least part of the parallel-bundle portion is bunched by a ferrule or a bushing or a harness.

16. An inductive heating assembly for conveying and inductively heating an aerosol-forming liquid, wherein the inductive heating assembly comprises:

at least one liquid-conveying susceptor assembly according to claim 1; and at least one induction source configured and arranged to generate an alternating magnetic field in a heating section of the filament bundle of the at least one liquid-conveying susceptor assembly.

17. The inductive heating assembly according to claim 16, wherein the filament bundle is arranged off-center with regard to a symmetry axis of the alternating magnetic field generated by the induction source in use of the heating assembly.

18. An aerosol-generating article for an inductively heatable aerosol-generating device, the aerosol-generating article comprising:

at least a first liquid reservoir configured to store a first aerosol-forming liquid, wherein the first liquid reservoir comprises an outlet; and at least a first liquid-conveying susceptor assembly according to claim 1, wherein the filament bundle of the first liquid-conveying susceptor assembly comprises a first filament bundle configured to deliver the first aerosol-forming liquid from the first liquid reservoir through the outlet into a region outside the first liquid reservoir.

19. An aerosol-generating article for an inductively heatable aerosol-generating device, the aerosol-generating article comprising:

at least a first liquid reservoir configured to store a first aerosol-forming liquid, wherein the first liquid reservoir comprises an outlet;

at least a second liquid reservoir configured to store a second aerosol-forming liquid, wherein the second liquid reservoir comprises an outlet; and at least a first liquid-conveying susceptor assembly according to claim 1 and a second liquid-conveying susceptor assembly according to claim 11, wherein the filament bundle of the first liquid-conveying susceptor assembly comprises a first filament bundle configured to deliver the first aerosol-forming liquid from the first liquid reservoir through the outlet into a region outside the first liquid reservoir, and the filament bundle of the second liquid-conveying susceptor assembly comprises a second filament bundle configured to deliver the second aerosol-forming liquid from the second liquid reservoir through the outlet into a region outside the second liquid reservoir.

20. An aerosol-generating system comprising an inductively heatable aerosol-generating device and an aerosol-generating article for the aerosol-generating device, wherein the aerosol-generating article comprises at least one liquid-conveying susceptor assembly according to claim 1, and wherein the inductively heatable aerosol-generating device comprises at least one induction source configured and arranged to generate an alternating magnetic field in a heating section of the filament bundle of the at least one liquid-conveying susceptor assembly of the aerosol-generating article, when the aerosol-generating article is in use with the inductively heatable aerosol-generating device.

21. A liquid-conveying susceptor assembly for conveying and inductively heating an aerosol-forming liquid under the influence of an alternating magnetic field, the susceptor assembly comprising a filament bundle, the filament bundle comprising at least a plurality of first filaments including a first susceptor material, wherein along at least a parallel-bundle portion of the filament bundle the plurality of first filaments are arranged parallel to each other, wherein the plurality of first filaments in the filament bundle comprises 30 to 50 first filaments.

* * * * *